3,442,848
POLYVINYL ALCOHOL SIZING COMPOSITIONS CONTAINING DELIQUESCENT COMPOUNDS AND PLASTICIZERS
Juniti Sezaki, Kibi-gun, Okayama-ken, and Tatsuaki Hattori, Kyoichiro Ikari, and Saburo Imoto, Kurashiki-shi, Japan, assignors to Kurashiki Rayon Co., Ltd., Kurashiki-shi, Japan, a corporation of Japan
No Drawing. Filed Mar. 8, 1967, Ser. No. 621,423
Claims priority, application Japan, Mar. 15, 1966, 41/16,256
Int. Cl. C08f 29/26, 45/72; C09k 3/00
U.S. Cl. 260—33.4                 7 Claims

ABSTRACT OF THE DISCLOSURE

Paper sizing compositions comprising a water-soluble polyvinyl alcohol paper sizing agent having a degree of polymerization of, for example, about 300 to 4000, preferably about 1000 to 2500, and a degree of saponification of, for example, about 35 to 100 mol. percent, a highly hygroscopic or deliquescent metallic compound capable of forming a molecular compound with polyhydric alcohols, in an amount of about 2 to 41 wt. percent with respect to the polyvinyl alcohol, and a polyhydric alcohol plasticizer for the polyvinyl alcohol, e.g. glycols, in an amount of about 2 to 35 wt. percent respect to the polyvinyl alcohol.

---

Water-soluble polyvinyl alcohols have been widely employed in sizing for paper and cardboard because of the excellent oil-resistant and film-forming properties of these alcohols. However, in sizing paper and cardboard, polyvinyl alcohols can cause straining of the calender rollers and drying rollers and paper peeling due to the adhesiveness of the alcohols. Accordingly, large amounts of such materials as starch, sodium carboxymethyl cellulose, sodium alginate, paraffin emulsions, etc., have been added to the paper and cardboard sizing compositions to reduce the roller staining and paper peeling characteristics. Even with the addition of such materials, however, these problems are often observed when the amount of sizing composition applied to paper is increased.

In accordance with the present invention a novel sizing composition for paper products has been found which has excellent working properties and which at the same time is relatively free from the drawbacks mentioned above such as roller staining or paper peeling, heretofore inherent in paper sizing agents chiefly composed of polyvinyl alcohol. In general, the sizing composition of this invention comprises polyvinyl alcohol paper sizing agent, a highly hygroscopic or deliquescent metallic compound capable of forming a molecular compound with polyhydric alcohols, e.g. calcium chloride or magnesium chloride, and a polyhydric alcohol plasticizer for the polyvinyl alcohol. The use of this composition as the sizing agent provides a strong paper with excellent working properties free from adhesiveness to drying rollers.

The polyvinyl alcohol paper sizing agent employed in this invention can be composed either exclusively of polyvinyl alcohol (PVA) or the polyvinyl alcohol can be mixed with a minor amount, e.g. up to about 25 wt. percent based on the PVA, with water-soluble sizing additives such as starch, modified starches, cellulose derivatives, polyethylene oxides, sodium polyacrylates, saponified copolymers of vinyl acetate and maleic anhydride, sodium alginate, etc., used heretofore, for instance, to improve the staining and paper peeling characteristics of the sizing composition. The polyvinyl alcohol used is water soluble and can be completely saponified PVA or partially saponified PVA. The degree of saponification of the polyvinyl alcohols employed in this invention can be, for example, about 35 to 100 mol. percent, preferably about 50 to 100 mol. percent. The degree of polymerization of the polyvinyl alcohol, upon which viscosity is dependent, can vary widely, e.g. about 300 to 4,000, but is often at least about 1000, preferably about 1000 to 2500.

In general, any highly hygroscopic or deliquescent metallic compound capable of forming a molecular compound with polyhydric alcohols can be used in the composition of this invention. Compounds having these properties are known and, for example, include halides of such metals as zinc, aluminum, chromium, alkaline earth metals, alkali metals, etc.; as well as the thiocyanates, nitrites and pyrophosphates of such metals, particularly those of the alkali and alkaline earth metals, and mixtures of these compounds. Examples of such compounds are calcium chloride, magnesium chloride, calcium bromide, magnesium bromide, zinc chloride, zinc bromide, calcium iodide, sodium chloride, aluminum chloride, chromium chloride, etc. and deliquescent metallic compounds such as calcium thiocyanate, potassium thiocyanate, potassium nitrite, potassium pyrophosphate, etc.

Polyhydric alcohols suitable for use in this invention are plasticizers for the polyvinyl alcohol including the alkyl, particularly lower alkyl, polyhydric acohols or alkanols having from 2 to 6 hydroxyl groups such as glycerin, butylene glycol, diethylene glycol, ethylene glycol, sorbitol, mannitol, trimethylolpropane, 1,3-propanediol, etc., and mixtures thereof. Preferred plasticizers for the polyvinyl alcohol include the glycols such as ethylene glycol, butylene glycol, or diethylene glycol.

The polyhydric alcohol plasticizer for polyvinyl alcohol or the highly hygroscopic or deliquescent metallic compound, when mixed alone with the polyvinyl alcohol sizing agent merely provides a plastifying effect or a swelling effect, respectively. A paper without adhesiveness to drying rollers can, however, be easily obtained by employing a mixture of the aforementioned two additives mixed in the amounts set forth below. The sizing solution of this invention can be obtained either by first dissolving the polyvinyl alcohol paper sizing agent in water and then adding the plasticizer and metallic compound, or by mixing the plasticizer and metallic compound with the paper sizing agent and then dissolving the thus obtained mixture in water. It is also possible to obtain a sizing solution according to this invention by mixing either one of the plasticizer or metallic compound with the sizing agent containing polyvinyl alcohol, dissolving the thus obtained mixture in water and adding the remaining plasticizer or metallic compound. Fillers such as clay and/or defoaming agent, if necessitated in order to increase the volume and/or to prevent permeation of the paper, can be added without any undesirable influence on the effects of this invention.

The composition of this invention generally contains the polyvinyl alcohol paper sizing agent, about 2 to 35 wt. percent, based on the amount of polyvinyl alcohol, of the polyhydric alcohol plasticizer for polyvinyl alcohol, and about 2 to 41 wt. percent, also based on the polyvinyl alcohol, of the metallic compound capable of forming a molecular compound with the polyhydric alcohol. When the sizing agent is exclusively polyvinyl alcohol, for example, the plasticizer for polyvinyl alcohol generally does not provide the desired results if it is present in an amount less than about 2 wt. percent, and the use of amounts larger than about 35 wt. percent can result in undesirable sizing properties. When the amount of metallic compound exceeds about 41 wt. percent with respect to the polyvinyl alcohol the surface of paper sized with the composition becomes sticky, while the desired effect of this invention is normally not fulfilled when the amount is less than about 2%. The preferred range for the amount of metallic compound, e.g. halide, is about 5 to 30 wt. percent with respect to the weight of the polyvinyl alcohol, and the use of such amounts fulfills the purposes of the invention without significantly deteriorating any properties of the sized paper. In a preferred mode of this invention the plasticizer for polyvinyl alcohol and the metallic compound can be employed in a range of about 5 to 30 wt. percent based upon the weight of the polyvinyl alcohol, especially in approximately equal amounts.

The following examples will serve to further illustrate the invention.

Example I

Mixtures consisting of polyvinyl alcohol having a degree of polymerization and degree of saponification of 1750 and 98.5 mol. percent, respectively, and equal amounts of glycerin and calcium chloride, respectively, in 2, 5, 10, 20, 40 and 60 wt. percent amounts with respect to the polyvinyl alcohol were dissolved in water with heating to form 5% aqueous solutions. At the same time, a 5% aqueous solution of the polyvinyl alcohol was prepared as a reference. These sizing solutions were then applied on C-class cardboard liners at a rate of 0.7 g. polyvinyl alcohol/m.$^2$, and dried by means of drying rollers. Sticking onto the rollers was observed with the samples in which the amounts of calcium chloride and glycerin were not more than 2 wt. percent with respect to the amount of polyvinyl alcohol. With samples containing each of glycerin and calcium chloride in an amount not less than 5 wt. percent with respect to polyvinyl alcohol, no adhesion to heating rollers was observed and the sized cardboard showed excellent properties.

The results of the tests on the sized cardboards are shown in Table I.

TABLE I

| CaCl$_2$+glycerin (1:1) percent/ polyvinyl alcohol | Degree of sizing,[1] sec. | Gloss of cardboard,[2] percent | Gloss after printing,[3] percent | Bending strength,[4] times | Abrasion resistance,[5] sec. |
|---|---|---|---|---|---|
| Untreated | 60.0 | 12.9 | 18.8 | 28 | 27 |
| 0 | 96.2 | 18.2 | 46.0 | 31 | 1,080 |
| 4 | 102.0 | 17.5 | 48.4 | 32 | 1,983 |
| 10 | 120.2 | 18.8 | 50.4 | 34 | 6,608 |
| 20 | 109.2 | 17.8 | 64.6 | 36 | 5,472 |
| 40 | 117.6 | 17.4 | 41.3 | 33 | 4,646 |
| 80 | 125.6 | 16.0 | 45.4 | 32 | 4,742 |
| 120 | 113.8 | 17.5 | 44.3 | 34 | 4,476 |

MEASURING METHOD

[1] Measured according to JIS-P-3122.
[2][3] Reflectance against an incident light at 45° measured with AKA spectrophotometer. Printing was carried out on an M-3 type printing machine provided from Miyagoshi Co., Ltd., at a printing pressure of 100 kg. using 0.7 g. of printing ink [SSS-C (T-7) produced by Naigai Ink Co., Ltd.].
[4] Measured according to JIS-P-8115.
[5] Data represent the time required for the wearing out of the sample in a Gakushin type testing machine.

Example II

10% aqueous solutions of polvinyl alcohol having a degree of polymerization of 1750 and a degree of saponification of 88 mol. percent, and magnesium chloride were prepared, and these solutions were mixed in 10:1 weight ratio, to which ethylene glycol was then added in 10 wt. percent amount with respect to polyvinyl alcohol. Water was added to make a sizing solution of 5% concentration. At the same time, a 5% aqueous solution of polyvinyl alcohol having a degree of polymerization of 1750 and a degree of saponification of 88 mol. percent was prepared as a reference. These sizing solutions were then tested on cardboard.

The sized samples according to this invention showed no adhering on drying rollers. In addition to this, these samples showed excellent characteristics in spite of the fact that the amount of polyvinyl alcohol applied on the cardboard was less than that in reference samples.

Example III

Polyvinyl alcohol having a degree of polymerization of 1230 and a degree of saponification of 92 mol. percent was mixed with diethylene glycol in 10:1 weight ratio, and the mixture was dissolved in water to make a 5% solution. 5% aqueous solutions of each of zinc chloride, calcium bromide, magnesium bromide, zinc bromide, zinc iodide, calcium thiocyanate, potassium nitrite and sodium chloride were prepared and respectively mixed with separate portions of the aforesaid solution in such a way to make the ratio of metal salt to polyvinyl alcohol 1:10, thus obtaining eight sizing solutions. These eight solutions were respectively applied on cardboard at a rate of 0.5 g./m.$^2$. These samples showed no adhering in drying on heated rollers.

Example IV

A mixture of polyvinyl alcohol having a degree of polymerization of 1400 and a degree of saponification of 96 mol. percent and calcium chloride in 100:10 weight ratio was dissolved in water with heating to make a 5% solution. Butylene glycol, ethylene glycol, sorbitol, trimethylol propane and mannitol were respectively added in 5 wt. percent amounts with respect to the polyvinyl alchol to make five sizing solutions, which were respectively applied on cardboard in a rate of 0.5 g./m.$^2$. These samples showed no adhering on drying rollers.

Example V

Polyvinyl alcohol having a degree of polymerization of 1750 and a degree of saponification of 98.5 mol. percent, chromous chloride and glycerin were mixed in 10:1:1 weight ratio and dissolved in water. A 10% aqueous solution of oxidized starch (#3400; Nihon Food Co., Ltd.) was then mixed with the solution to obtain solutions in the weight ratios of 2:8, 3:7 and 5:5 in net content to make 4% sizing solutions, which were applied on high quality paper at a rate of 0.5 g./m.$^2$. These samples showed no adhering on drying rollers.

The embodiments of the invention in which an exclusive property or privilege is claimed are defined as follows:

1. A composition comprising a water-soluble polyvinyl alcohol sizing agent in which the polyvinyl alcohol has a degree of polymerization of about 300 to 4000 and a degree of saponification of about 50 to 100 mol. percent, a highly hygroscopic or deliquescent metallic compound capable of forming a molecular compound with a polyhydric alkanol in an amount of about 2 to 41 wt. percent with respect to the polyvinyl alcohol, said compound being selected from the group consisting of the nitrites, pyrophosphates, and thiocyanates of a metal selected from the group consisting of alkali metals, alkaline earth metals, zinc, aluminum and chromium and a polyhydric alkanol plasticizer for the polyvinyl alcohol in an amount of about 2 to 35 wt. percent with respect to the polyvinyl alcohol, the polyhydric alkanol having 2 to 6 hydroxyl substituents.

2. The composition of claim 1 wherein the polyvinyl alcohol has a degree of polymerization of about 1000 to 2500.

3. The composition of claim 1 wherein the compound is a nitrite.

4. The composition of claim 1 wherein the compound is a pyrophosphate.

5. The composition of claim 1 wherein the compound is a thiocyanate.

6. The composition of claim 1 wherein the polyhydric alkanol is a lower alkanol having two hydroxyl groups.

7. The composition of claim 1 wherein the metallic compound and polyhydric alkanol are present in an amount in the range of about 5 to 30 wt. percent based upon the weight of polyvinyl alcohol.

References Cited

UNITED STATES PATENTS

| | | | |
|---|---|---|---|
| 2,127,896 | 8/1938 | Vohrer | 260—33.4 |
| 2,246,915 | 6/1941 | Dangelmajer | 260—33.4 |
| 2,340,966 | 2/1944 | Dangelmajer | 260—33.4 |
| 3,218,183 | 11/1965 | Fritzsching et al. | |

ALLAN LIEBERMAN, *Primary Examiner.*

L. T. JACOBS, *Assistant Examiner.*

U.S. Cl. X.R.

117—155

UNITED STATES PATENT OFFICE
CERTIFICATE OF CORRECTION

Patent No. 3,442,848 May 6, 1969

Juniti Sezaki et al.

It is certified that error appears in the above identified patent and that said Letters Patent are hereby corrected as shown below:

Column 1, line 27, after "percent" insert -- with --; line 35, "straining" should read -- staining --. Column 6, line 5, "2,340,966" should read -- 2,340,866 --.

Signed and sealed this 9th day of June 1970.

(SEAL)
Attest:

Edward M. Fletcher, Jr.  
Attesting Officer

WILLIAM E. SCHUYLER, JR.  
Commissioner of Patents